Nov. 3, 1959     R. L. THORMAN     2,910,942

FLUID PRESSURE SUPPLY SYSTEM

Filed Sept. 26, 1956

INVENTOR.

Richard L. Thorman

BY W. C. Middleton

ATTORNEY

United States Patent Office 2,910,942
Patented Nov. 3, 1959

2,910,942

FLUID PRESSURE SUPPLY SYSTEM

Richard L. Thorman, Detroit, Mich., assignor to General Motors Corporation, Detroit, Mich., a corporation of Delaware Application September 26, 1956, Serial No. 612,321

2 Claims. (Cl. 103—4)

This invention relates to fluid pressure supply systems and more particularly to an improved fluid pressure supply system for a vehicle transmission.

Fluid pressure supply systems incorporating a pair of pumps, one being engine driven and one being driven by the transmission power delivery shaft have heretofore been employed in connection with vehicle transmissions. In the supply systems heretofore employed, undesirable results have been obtained due to the action of the transmission power delivery shaft driven pump when the vehicle is operated in reverse. Under such operation, the transmission driven pump is operated in a reverse direction with respect to the direction of rotation of the engine driven pump and in systems wherein the front and rear pump both supply under pressure to a common delivery passage, the transmission driven pump robs oil supplied to the common delivery passage by the engine driven pump thereby causing an undesirable drop of fluid pressure in the oil delivery passage. In addition, it has been found that in fluid pressure supply systems of the type disclosed that the transmission driven pump becomes very noisy in reverse operation due to the fact that the pump will draw air into the system which results in a fluctuation of the load applied to the pump gears and results in considerable gear chatter and noise. A further undesirable characteristic of conventional pumping systems of the type described is that the transmission driven pump pumps air into the transmission sump in reverse operation, thereby causing bubbling with consequent aeration of the fluid supply in the sump.

An object of this invention is to provide an improved transmission fluid pressure supply system of the type including a pair of pumps for supplying fluid pressure to a common delivery passage and wherein one pump may be operated in a reverse direction of rotation with respect to the direction of rotation of the other pump incorporating means for preventing the one pump from drawing fluid from the common delivery passage when the one pump is so operated.

Another object of this invention is to provide an improved transmission fluid pressure supply system of the type described incorporating a fluid recirculation circuit adapted to be blocked off from the common pump distribution passage when the transmission driven pump is driven in reverse, such that any fluid or air or the combination of the same in the recirculation circuit is continuously circulated through the transmission driven pump during its reverse operation.

A further object of this invention is to provide an improved transmission fluid pressure supply system of the type described wherein the recirculation system for the transmission driven pump is automatically rendered operative and inoperative depending upon the direction of rotation of the transmission driven pump.

A still further object of this invention is to provide in a transmission fluid pressure supply system of the type having an engine driven pump and a transmission driven pump adapted to deliver fluid under pressure to a common distribution passage, a check valve in the common distribution passage for preventing flow of fluid from the engine driven pump to the transmission driven pump together with a passage connecting the suction side of the transmission driven pump to the discharge side thereof and to provide a check valve in the last mentioned passage to prevent fluid flow therethrough when the transmission driven pump is rotated in one direction and to permit fluid flow therethrough when the transmission driven pump is rotated in the opposite direction.

These and other objects and advantages of this invention will be apparent from the following specification and claims taken in conjunction with the accompanying drawings in which:

Figure 1:
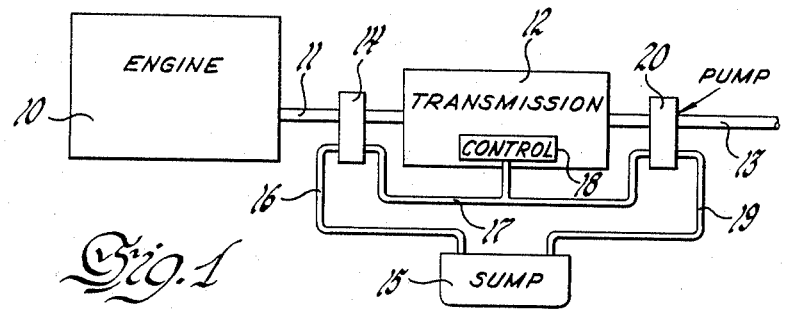
Figure 1 is a schematic diagram in block form showing the primary distribution system as being supplied with fluid from an engine driven and a transmission driven pump.

Referring to Figure 1, there is shown in block form a vehicle engine 10 adapted to drive a power shaft 11 which is the power input shaft to an automatic transmission 12 of a type commonly employed in commerce. A shaft 13 represents the transmission power delivery shaft which may be connected to drive a vehicle by any common drive mechanism, not shown. The transmission unit 12 is of the type arranged to provide for neutral or no drive, forward drive, or reverse drive of the vehicle in which it is employed. An engine driven pump 14 driven by shaft 11 is arranged to draw a working fluid such as oil, for example from a transmission sump 15 by way of a pump suction passage 16 and deliver the same under pressure to a pressure conduit 17 connected to a control housing indicated at 18 which contains valving (not shown) suitable to control the drive condition of the transmission. The valves (not shown) in housing 18 are arranged to select forward, neutral or reverse drive through the transmission as is conventional practice. In forward drive the drive ratio control valving in housing 18 may automatically be operated to establish changes of drive ratio through a series of steps, for example, four in number, or a single change in ratio if desired. A pump 20 driven by transmission power delivery shaft 13 will rotate in one direction in forward vehicle drive and in the opposite direction in reverse vehicle drive. In neutral, with the vehicle standing still, shaft 13 and pump 20 will be stationary. Pump 20 is adapted to draw working fluid from sump 15 through pump suction passage 19 and deliver the same under pressure to passage 17 whenever the vehicle is in forward motion.

Engine driven pump 14 may be of the gear type but is preferably a vane-type pump. Pump 20 driven by shaft 13 is preferably a gear type pump. It will readily be understood that in forward vehicle drive, both pumps 14 and 20 supply fluid under pressure to passage 17. In reverse vehicle drive, gear pump 20 will be rotated in a direction opposite its direction of rotation in forward drive and will therefore tend to draw fluid from passage 17 and deliver the same back to the sump 15 through suction passage 19. Such action is undesirable in that it tends to reduce the pressure maintained in passage 17 by engine driven pump 14. It has also been found that due to variation in dimensional limits and tolerances in large scale manufacture, that the pump 20 will tend to draw air into the system when the vehicle is operated in reverse. This is objectionable because it results in variation and fluctuation in the loading of the pump gear teeth with a consequent gear clatter when the vehicle is operated in reverse. In addition, the air which is drawn into the system by pump 20 when operating in reverse is pumped back into sump 15 through passage 19, thereby aerating the fluid in the sump. To prevent the pump 20 from drawing oil from passage 17, to provide uniform tooth loading of the teeth of gear pump 20, and to prevent aeration of the oil in sump 15, the auxiliary fluid recirculation circuit and valving of Figures 2 and 3 is provided.

Figure 2:
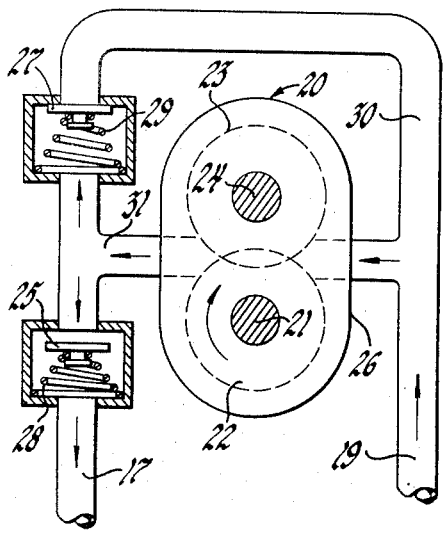
Figure 2 is a schematic diagram of the transmission driven pump together with the auxiliary recirculation system for the transmission driven pump and illustrating the valve positions as they exist when the vehicle is under motion in forward drive.
Figure 3:
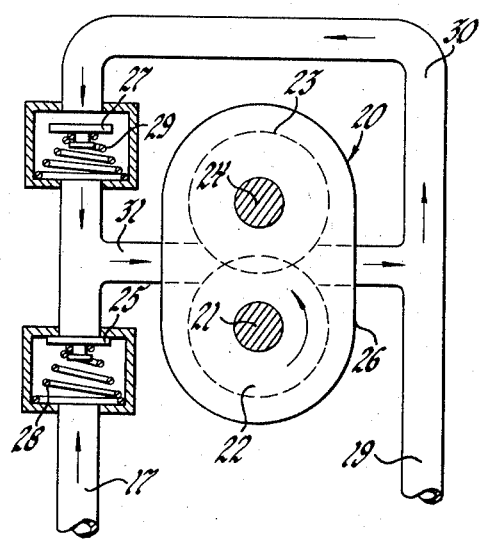
Figure 3 is a schematic diagram of the transmission driven pump together with the auxiliary recirculation system for the transmission driven pump and illustrating the valve positions as they exist during reverse drive of the vehicle.

In Figure 2 the transmission driven pump 20 and the valving associated therewith are illustrated as being operated in forward drive. A gear 22 fixed to shaft 21 drives a gear 23 mounted upon a shaft 24 to draw through pump suction passage 19 and deliver the same to conduit 17 through a check valve 25. The pump 20 is mounted on shaft 21 remote from sump 15 and due to leakage between the shaft 21 and the pump case 26 where the shaft extends through the case, a certain amount of air is drawn into the system when the vehicle is operated in reverse. As shown, a fluid recirculation system is provided which includes a passage 30 connected to passage 19 on the suction side of the pump and connected to conduit 17 on the delivery side of the pump. A check valve 27 is positioned in passage 30.

In forward operation of the vehicle, pump 20 draws fluid from sump 15 of Figure 1 through passage 19 and delivers the same to passage 17 through branch 31, the check valve 27 being closed and check valve 25 being open. During forward operation of the vehicle, no air is drawn into the pump because the discharge pressure acting on the pump is substantially greater than atmospheric pressure. While there may be a limited amount of oil leakage between the shaft 21 and the pump case 26 in forward operation of pump 20, this leakage is of no consequence because the pump capacity is sufficient to provide the system requirements irregardless of the leakage. Whatever oil leaks out of the pump merely falls down into the sump to be added to the fluid supply.

In reverse operation of the vehicle, pump 20 tends to draw oil from passage 17, thereby robbing the system of oil delivered by engine driven pump 14 of Figure 1. Check valve 25 is closed so that oil supplied to passage 17 by pump 14 cannot escape through pump 20. Due to suction created by reverse operation of pump 20, the Check valve 25 is closed so that oil supplied to passage circuit is provided for pump 20. Any air which may be drawn into the recirculation system due to pump leakage is continuously recirculated through passage 30, check valve 27, branch passage 31, and back through pump 20 to passage 19. It will be understood that the pressure in the recirculating system can never be greater than atmospheric pressure. In initial reverse operation, air will be drawn into the system because the pressure in the pump will be less than atmospheric pressure. However, once a sufficient quantity of air is drawn into the system to tend to build up a pressure in the recirculation system greater than atmospheric pressure, the air will be forced out of the pump through the same leakage passages by which it was initially drawn into the recirculation system. Thus, in reverse operation, the recirculation system quickly establishes a uniform pressure therein which is substantially atmospheric pressure. The equilibrium established in the recirculation system prevents gear clatter and also prevents the discharge of air into the transmission sump through passage 19. Since the pipe 19 is submerged in the sump oil supply and since the pressure in the passage 19 is maintained at substantially atmospheric pressure during reverse operation of the vehicle, whatever air may be drawn into the system is simply continuously circulated through the recirculation circuit and is not forced into the oil supply.

In Figures 2 and 3, the check valves 25 and 27 are shown as being biased toward their closed positions by conical springs 28 and 29 respectively. These springs are of very light weight so that either a slight vacuum on the spring side of valve 27, or a very low pressure against the valves on the side opposite springs will cause valves to open. Thus, valve 25 will close and valve 27 will quickly open as soon as the transmission driven pump begins to operate in reverse. This prevents pressure build up in the recirculation system so that no air will be forced back into the sump. In forward operation of the vehicle, pump discharge passage 31 will deliver fluid pressure to the common discharge passage 17 for pumps 14 and 20, but valve 27 prevents flow of fluid to passage 30. In reverse operation of the vehicle, passage 31 is connected to passage 30 through valve 27, the valve 27 being opened, but passage 17 is blocked off from both passages 31 and 30 by valve 25. A low pressure (substantially atmospheric) is maintained in passages 30, 31 and 19 when the vehicle is operated in reverse. The recirculating system therefore prevents pressure build-up and forcing of air into the sump. The equilibrium condition in the recirculating circuit provides for uniform loading of the pump gear teeth, thereby preventing objectionable gear noise during reverse operation of the vehicle.

It is herewith acknowledged that changes in construction and arrangement of parts may be made, but such changes are within the scope of the invention herein disclosed and as defined in the appended claims.

I claim:

1. In a fluid pressure supply system, a pump, a driving member for driving said pump in opposite directions of rotation, a suction line, and a delivery line for fluid drawn by said pump through said suction line during operation of said pump in one direction of rotation thereof, a recirculating line between said suction and delivery lines, a second pump adapted to deliver fluid under pressure to said delivery line, a check valve in said delivery line disposed between said pumps, a second check valve in said recirculation line, said first check valve being open and said second check valve being closed when said first mentioned pump delivers fluid to said delivery line, and said first check valve being closed and said second check valve being open when said first mentioned pump is operated in reverse direction of rotation.

2. In a fluid pressure supply system, a fluid sump, a pump positioned remote from the fluid in said sump, a driving member for alternately driving said pump in opposite directions of rotation, a suction line connecting said pump to said sump and extending into said sump below the level of fluid in said sump, a delivery line connected to said pump for receiving fluid drawn by said pump through said suction line when said pump is rotated in one direction of rotation, a recirculating line between said suction and delivery lines, a second pump hydraulically connected to said sump and to said delivery line and effective to deliver fluid under pressure to said delivery line, a check valve in said delivery line disposed between said pumps, a second check valve in said recirculation line, said first check valve being open and said second check valve being closed when said first-mentioned pump is rotated in one direction of rotation, and said first check valve being closed and said second check valve being open when said first-mentioned pump is rotated in the opposite direction of rotation.

References Cited in the file of this patent

UNITED STATES PATENTS

| | | |
|---|---|---|
| 1,881,554 | Heckert | Oct. 11, 1932 |
| 2,633,760 | Kelley | Apr. 7, 1953 |

UNITED STATES PATENT OFFICE
CERTIFICATE OF CORRECTION

Patent No. 2,910,942　　　　　　　　　　　　　　　November 3, 1959

Richard L. Thorman

It is hereby certified that error appears in the printed specification of the above numbered patent requiring correction and that the said Letters Patent should read as corrected below.

Column 1, line 29, after "supply" insert -- fluid --; column 3, line 50, for "Check valve 25 is closed so that oil supplied to passage" read -- check valve 27 is opened so that an auxiliary recirculation --.

Signed and sealed this 16th day of August 1960.

(SEAL)
Attest:

CARL H. AXLINE
Attesting Officer

ROBERT C. WATSON
Commissioner of Patents